United States Patent [19]

Elvira

[11] Patent Number: 4,610,907
[45] Date of Patent: Sep. 9, 1986

[54] METAL CORE OF SECTIONS FOR AUTOMOVILE AND SIMILAR VEHICLES

[75] Inventor: Victorino V. Elvira, Arnedo, Spain

[73] Assignee: Elastomeros Riojanos S.A., Arnedo, Spain

[21] Appl. No.: 523,690

[22] Filed: Aug. 16, 1983

[30] Foreign Application Priority Data

May 5, 1983 [ES] Spain ................................ 522.135

[51] Int. Cl.$^4$ ............................................. E06B 7/16
[52] U.S. Cl. .................................... 428/122; 49/440; 49/441; 49/491; 428/358
[58] Field of Search ................. 428/122, 358; 49/440, 49/441, 490, 491; 52/397, 670, 716

[56] References Cited

U.S. PATENT DOCUMENTS

| | | | |
|---|---|---|---|
| 2,290,842 | 7/1942 | Bush | 428/122 X |
| 4,310,164 | 1/1982 | Mesnel | 428/122 X |
| 4,348,443 | 9/1982 | Hein | 428/122 |
| 4,374,880 | 2/1983 | Mesnel | 428/122 X |
| 4,411,941 | 10/1983 | Azzola | 428/122 |

FOREIGN PATENT DOCUMENTS 967113 8/1964 United Kingdom ............... 428/122

*Primary Examiner*—Henry F. Epstein
*Attorney, Agent, or Firm*—Ladas & Parry

[57] ABSTRACT

A metal core is obtained from a continuous metallic strip, having proper characteristics as far as plasticity and ductility are concerned. This metal band or strip is die-cut to provide a reticulate structure formed by hexagons rather contracted lengthwise. These hexagons constitute a lineup in such longitudinal direction and, in a later phase, are subjected to a folding operation so that their larger sides similar to adjacent hexagons form the central portion of the channeled section, while the joints remain on the side portions of the channeled section. Besides, the side apices of these hexagons extend, forming small flaps which, in turn, make the joints in between take the center line of the mentioned side portions of the channeled sections.

4 Claims, 10 Drawing Figures

METAL CORE OF SECTIONS FOR AUTOMOBILE AND SIMILAR VEHICLES

The present invention, as enunciated under the title of this specification, relates to improvements introduced in the stiffening metal core for sections as used in vehicles, particularly those attached to the outer surfaces of sealable recesses such as for doors, boots, bonnets, etc.

As generally known, this type of sections consists of an elastomeric or plastic material channeled U-shaped section which usually takes on a rubber weather-strip. The channeled section being the one which clamps or grasps the perimeter flange of the recess where the section is to be installed. The rubber weather-strip fastened to the channeled section provides the seal for the door.

The stiffening metal core shall be such as to permit complete resiliency of the section in all directions from a plane perpendicular to the longitudinal axis, in order to suit the peculiar and variable shape of every recess to be sealed. Also, it will provide enough rigidity in its final position so as to prove stable in such position.

Moreover, in accordance with the requirements set up by car manufacturers, the section should not stretch so that there is no surplus section upon completion of normal handling and installation. Any surplus section would necessarily have to be cut, an additional and unwanted operation. It would also mean removal of the rust-resistant protective coating factory-applied on section ends.

Finally, also in accordance with the rules or requirements of car manufacturers, the section should offer a certain ability for shrinking or compressing and, of course, to remain stable in that position.

As work is customarily performed with a slightly excessive quantity of section (the length of the section is somewhat larger than the length of the perimetric recess) and the surplus section is to be self-absorbed by the section proper, the shrinking ability is highly recommendable.

In conclusion, a good section would be one ductile or resilient in all directions of a plane perpendicular to its longitudinal axis that practically did not stretch and, conversely, had the ability to shrink.

Section manufacturers normally use a different metal core depending on its concrete position. Metal cores or reinforcements that fulfill some requirements better than others are used and, commonly, two or more different designs are used by the same manufacturers, who will choose accordingly.

It should also be pointed out that originally practically all metal reinforcements satisfactorily meet the non-stretching requirement, but such property is normally sacrificed for the sake of improving the remaining desirable properties of the section, whereby it is subjected to a number of alternative movements that cause breaking of the connecting links of the various modules forming the metal core or reinforcement.

On breaking the links between modules, a greater shrinking capacity is indeed achieved and ductility and flexibility are also improved, but then the section will, on the contrary, be rather prone to stretching or lengthening.

When breaking of the links between modules of the metal cores occurs, breakage that as stated above results in the loss of non-stretching ability, such condition is usually improved by imbedding threads in the elastomeric or plastic mass forming the channeled section and, of course, placed lengthwise. However, this solution does not provide satisfactory enough results as although the thread or threads will really not stretch, the elastomeric or plastic material slips along the threads and eventually stretches. Obviously, the insertion of these antistretching threads also means a further complication in the manufacturing process.

Through the procedure that the invention presents, a stiffening metal core is achieved which, besides allowing enough contraction or shrinking of the section, is practically unstretchable within the limits of tensile stress regarded as normal in this field. Complementarily, it presents outstanding handling qualities in all directions, thus permitting utilization for any section regardless of application (for a door, boot or bonnet).

Consequently, the metal core is obtained from a continuous metallic strip, having proper characteristics as far as plasticity and ductility are concerned. This metal band or strip is die-cut to provide a reticulate structure formed by hexagons rather contracted lengthwise. These hexagons constitute a lineup in such longitudinal direction and, in a later phase, are subjected to a folding operation so that their larger sides similar to adjacent hexagons form the central portion of the channeled section, while the joints between reticules remain on the side portions of the channeled section. Besides, the side apices of these hexagons extend, forming small flaps which, in turn, make the joints in between to take the center line of the metnioned side portions of the channeled sections. Flexibility is thus improved in the assembly which, after all, functions like an accordion.

To complement the description to be given below and in order to assist in a better understanding of the characteristics of the invention, a set of drawings is attached to the present specification, forming an integral part thereof, in which the following has been shown, with an illustrative and unlimiting nature.

Figure 7:
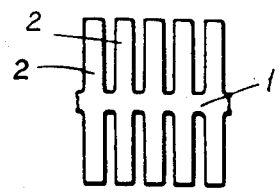
FIGS. 1 and 7 are a perspective detail view and an extended view of the metal core of a conventional type section.
Figure 1:
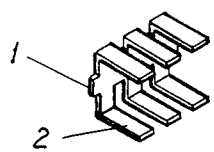
Figure 8:
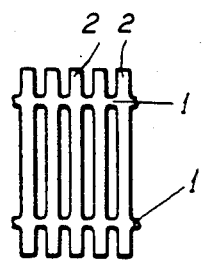
FIGS. 2 and 8 are a similar view to FIG. 1, showing a metal core of other sections normally used at present.
Figure 2:
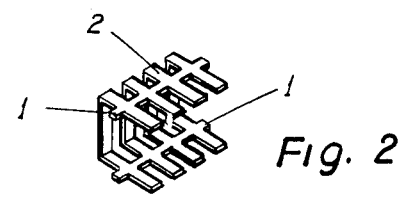
Figure 10:
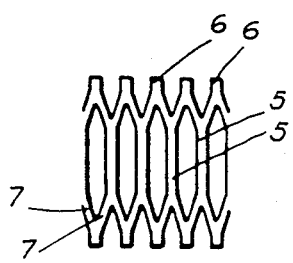
FIGS. 4 and 10 are a perspective and extended view of a metal core for vehicle sections as covered by the present invention.
Figure 3:
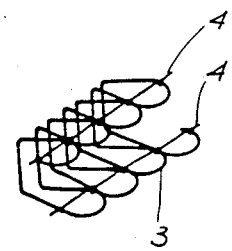
Figure 5:
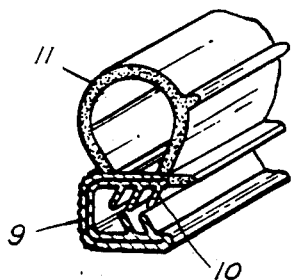
FIGS. 5 and 6 show a typical section for vehicles with the channeled section incorporating a metal core or reinforcement.
Figure 6:
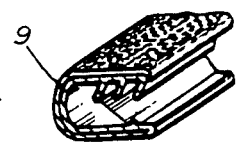

In the light of these FIGS., and specially FIGS. 1, 2 and 3, it is observed that conventional vehicle sections are provided with a metal core, which in FIG. 1 takes a comb-like shape formed by a longitudinal rib 1 and a plurality of cross flaps 2 equal and equidistant. This "comb" takes a channeled shape and once covered with the material fastening the section to the recess frame, the resulting structure will provide good operative conditions in respect to some desirable requirements in every section but not so good as regards other ones. Thus, for example, a section fitted with this metal core will not stretch or lengthen, but will hardly shrink. It will acceptably bend upwards and downwards but flexibility will be far from suitable cross-wise. This is precisely a typical case when the connecting links of the U-shaped modules are normally broken for better shrinking capacity and improved ductility and flexibility, but then the section easily tends to stretching.

Another conventional solution is shown in FIG. 2, wherein the metal core presents a similar arrangement to the previous one, but incorporating two longitudinal ribs 1' which interconnect the multiple cross modules 2'. A section designed with this metal core will no doubt be hardly flexible or shapable cross-wise and will easily bend upwards and downwards.

There is another solution known that offers good results, i.e. wherein the metal core is constituted from an spiral-shaped wire which is knotted in place by longitudinal threads. This solution is shown in FIG. 3, and in view of the material that conforms the metal core it is clear that the section will be extremely flexible in all directions and will even afford complete recuperative power due to the flexible nature of the wire reinforcement 3. On the other hand, the threads 4 which are sewn or knotted to the coiled wire, will prevent the section from stretching but not from shrinking.

The preceding solution, based on a pre-shaped wire metal core, although being exceptional, offers some disadvantages as compared with the one set forth under the present invention. The ones most outstanding would be the following:

The installation, machinery and manufacturing process are more complex and a larger investment is required to start up a manufacturing line based on this solution.

Complete flexibility and recuperative power of a section provided with a wire-based core and antistretching threads are exactly the reason of some fitting problems at points or locations where the flexure of the coiled wire may cause dislodgement or removal of the section from its position.

By means of the improvements which the invention presents, the reinforcement core for vehicle sections and others eventually achieved, presents functional characteristics similar to those of the sections provided with sewn wire reinforcements. Manufacturing costs are, however, lower and, above all, the required investment in machinery and installation is substantially less costly. Further, the section that the invention presents, due to its permanent flexibility, does not cause any fitting problems, i.e., dislodgements or position change, as previously outlined in the case of sections with wire reinforcement.

Compared with the metal cores or reinforcements constituted by die-cut metal strip, it offers the following advantages: better ductility in all directions; utilization with any section regardless of its position; it is not necessary to break the connecting links, the non-stretching ability being thus kept; due to its specific configuration it has a high degree of compression and shrinking.

Figure 4:
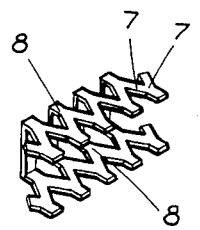
Figure 9:
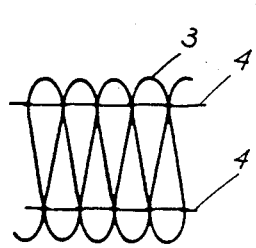
FIGS. 3 and 9 are another type of metal core, in this case constituted from a metal wire.

Therefore, as previously explained, work is started with a continuous metal strip having proper flexibility and ductility, which is preferably subjected to a die-cut process whereby a reticular structure made up of hexagons is obtained, as shown in FIG. 4, rather contracted lengthwise, so that the two parallel and neighbouring sides 5 of each hexagon are much longer than the other sides, each of these sides 5 being also common to two adjacent hexagons.

Moreover, the side, end apices of each hexagon extend forming a small flap 6. The oblique sides 7 can of the same or different width than the larger sides 5, depending of the resilient characteristics, basically lengthwise, intended for the section.

After the die-cut process, the continuous strip is folded to form a channeled configuration. Folding is carried out in parallel and longitudinal lines next to the side ends 5, in such a way that the smaller, oblique sides 7 of the reticule hexagons fall in the center line of the side portion of the resulting channeled section.

With this arrangement, and as clearly understood by looking at FIG. 4, the channeled section provided with this metal core will easily bend in all directions, same as an accordion. It has a rather high shrinking capacity, as the hexagons can be contracted further, and it stands very well the expected tensile stress in this sort of sections.

As generally known, the metal core obtained with this invention is housed in the channeled body 9, made of elastomeric or plastic material and equipped with inner flanges 10 to fasten to the recess frame. A greatly flexible tubular unit 11, normally made of rubber, is attached to the channeled body, and constitutes the door sealing weather strip.

I claim:

1. An improved metal core for sections of automobile and similar vehicles, which besides providing optimum results as regards stiffening effects, is intended to make sure that a weatherstrip is easily ductile in any direction within a plane perpendicular to its own axis and, having a slight shrinking ability, is not capable of being lengthened, comprising:

said core being formed from a continuous strip of a metal and proper moulding and ductility, said core having a recticular shape formed by hexagons contracted lengthwise so that the two parallel and neighboring sides of each hexagon are much longer than other pairs of complementary sides, each pair constituting an acute angle, the die-cut strip is folded by two imaginary longitudinal lines touching the larger sides of the hexagons at points next to the side ends whereby said core assumes a U-shaped section.

2. An improved metal core, as claimed in claim (1), 1 wherein the larger side of two adjacent hexagons is common to both hexagons, while the acute apices of the hexagons extend laterally to form a small rectangular flap.

3. An improved metal core as claimed in claims 2 or 1 wherein sides of the hexagon can be of the same width.

4. An improved metal core as claimed in claims 2 or 1, wherein the larger sides of each hexagon are substantially wider than the oblique sides and of same width as the end flaps.

* * * * *